United States Patent
Hong et al.

(10) Patent No.: US 8,426,507 B2
(45) Date of Patent: *Apr. 23, 2013

(54) COMPOSITION OF ECO-FRIENDLY HOT MELT ADHESIVE

(75) Inventors: SeungGweon Hong, Daejeon (KR); JaeYoung Park, Wonju-si (KR); HyeLim Kim, Busan (KR); KwangJin Chung, Daejeon (KR); MyungAhn Ok, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/307,642

(22) Filed: Nov. 30, 2011

(65) Prior Publication Data

US 2012/0165441 A1    Jun. 28, 2012

(30) Foreign Application Priority Data

Dec. 28, 2010   (KR) .......................... 10-2010-0136951

(51) Int. Cl.
    *C08K 5/103*    (2006.01)

(52) U.S. Cl.
    USPC ............................ 524/312; 524/386; 524/388

(58) Field of Classification Search .................. 524/312, 524/386, 388
    See application file for complete search history.

(56) References Cited

U.S. PATENT DOCUMENTS

2012/0157592 A1*  6/2012  Hong et al. .................... 524/145

* cited by examiner

*Primary Examiner* — Peter Szekely
(74) *Attorney, Agent, or Firm* — The Webb Law Firm

(57) ABSTRACT

Provided is a polypropylene carbonate based resin composition used as a hot melt adhesive. In detail, the present invention is to provide a composition of the hot melt adhesive having high adhesion to a polar surface of the polypropylene carbonate resin based hot melt adhesive and adhesion to a non-polar surface. The composition of hot melt adhesive according to the present invention has excellent compatibility between raw materials so as to have a completely uniform phase, thereby increasing cohesive energy as the adhesive and having the excellent adhesion to the polar or non-polar surface.

10 Claims, 1 Drawing Sheet

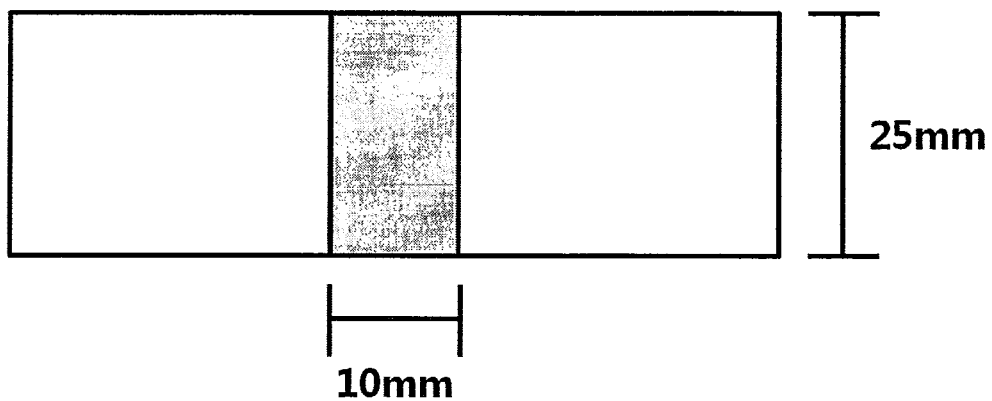

COMPOSITION OF ECO-FRIENDLY HOT MELT ADHESIVE

CROSS-REFERENCE TO RELATED APPLICATIONS

This application claims priority under 35 U.S.C. §119 to Korean Patent Application No. 10-2010-0136951, filed on Dec. 28, 2010, in the Korean Intellectual Property Office, the disclosure of which is incorporated herein by reference in its entirety.

TECHNICAL FIELD

The present invention relates to a hot melt resin composition having adhesion to a polar surface and a non-polar surface by securing the adhesion to the polar surface and supplementing the adhesion to the non-polar surface using modified terpene resin, while realizing low carbon generation during life cycle assessment (LCA) (analysis of carbon emission) of hot melt adhesive using polypropylene carbonate resin as hot melt resin.

BACKGROUND

The use of a hot melt adhesive, which is an adhesive melted by heat, has gradually increased as an eco-friendly adhesive since an emission of a volatile organic solvent is very small. Recently, efforts to prevent global warming while preventing a volatile organic compound harmful to human from being emitted have been institutionalized in terms of protecting the environment. As a part of worldwide efforts, the use of resin that less emits carbon dioxide, i.e., has a low life cycle assessment value has been requested. Polypropylene carbonate, which is prepared using carbon dioxide as a raw material, has an LCA value of 1.3, which is much lower value than other polymer resins such as polyethylene, polypropylene. Therefore, a method of reducing carbon emission during a process of preparing a hot melt adhesive composition by preparing the hot melt adhesive using the polypropylene carbonate resin has been suggested. The polypropylene carbonate, which is resin having high polarity, has surface energy that reaches 48 dyne/cm according to Owens calculation. Due to the polar surface, the polypropylene carbonate has excellent adhesion to the polar surface. An example of the polar surface having high adhesion to the polypropylene carbonate may include cellulose of polarity in wood, which has very large adhesion thereto and thus, does not cause interface peeling when being bonded to a surface such as glass. However, it is difficult to sufficiently show the adhesion to a polyvinyl chloride sheet surface having low polarity, which needs to be improved.

Generally, the hot melt adhesive is composed of tackifier in the same amount of ethylene vinyl acetate and wax to lower viscosity.

The most general hot melt adhesive composition is composed of 40 wt % of ethylene vinyl acetate, 40 wt % of tackifier, and 20 wt % of wax. In the ethylene vinyl acetate, a ratio of vinyl acetate is generally 20 to 40 wt %. As the tackifier, gum rosin, rosin ester, C5 petroleum resin, C9 petroleum resin, coumarone resin, acrylic-modified petroleum resin, or the like, may be used. As the wax, paraffin wax, polyethylene wax, polypropylene wax, or the like, are used. The existing hot melt adhesive composition having the above composition shows the adhesion to various materials; however, does not show adhesion approximating to adhesion of an epoxy or urethane adhesive and has low flexibility and adhesion at low temperature. Therefore, the existing hot melt adhesive composition has a limitation in being used as the adhesive in various fields.

Meanwhile, the adhesion to the polar surface of the polypropylene carbonate has very higher than that of the existing ethylene vinyl acetate, which allows the adhesive composition to sufficiently secure adhesion. However, there is a need to combine the tackifier to increase the adhesion to the non-polar surface or the polar surface having low polarity. The polypropylene carbonate resin has compatibility with several polar resins; however, does not have compatibility with the tackifier having low polarity such as rosin, petroleum resin, or the like, which is present in two phases such as a continuous phase and a disperse phase even when being mixed. As a result, the mechanical strength of the hot melt adhesive composition is lowered. In order to use the polypropylene carbonate as the multi-purpose hot melt adhesive, there is a need to improve the adhesion and increase the mechanical strength such as tensile strength by using the tackifier having excellent compatibility.

SUMMARY

In order to solve the above-mentioned problem, the tackifier having excellent compatibility with the polypropylene carbonate and the increased adhesion to the non-polar surface is secured as a result of a study for various kinds of tackifiers and the composition of hot melt adhesive using the polypropylene carbonate as the adhesive having the sufficient mechanical strength while having the excellent adhesion and flexibility at a wide temperature range at the time of applying the hot melt composition is provided.

Therefore, an embodiment of the present invention is directed to providing an eco-friendly hot melt adhesive composition without excessively depending on surface polarity by applying resin using carbon dioxide to less emit carbon to a hot melt adhesive composition and using tackifier as resin having high compatibility.

The present invention relates to a resin composition based on polypropylene carbonate resin for solving the above-mentioned technical problems. The polypropylene carbonate used as a vehicle of a composition of a hot melt adhesive according to the present invention is acquired by polymerization reaction of carbon dioxide and propylene oxide, wherein a weight-average molecular weight of the polypropylene carbonate may be about 5,000 to 100,000. The polypropylene carbonate resin of which the weight-average molecular weight is larger than 100,000 may be inappropriate in terms of high viscosity at melting temperature and the polypropylene carbonate resin of which the weight-average molecular weight is smaller than 5,000 may be inappropriate in terms of strength due to low cohesive energy as the adhesive. The polypropylene carbonate having the weight-average molecular weight in the above range may be advantageous in strong cohesive force and low melting viscosity as the adhesive. There is provided a method of securing the adhesion to the polar surface by using the above-mentioned polypropylene carbonate resin and securing the high adhesion to even the non-polar surface by providing the tackifier of phenol-modified terpene resin having the excellent compatibility with the polypropylene carbonate.

The hot melt adhesive of the polypropylene carbonate and the phenol-modified terpene resin has the excellent adhesion to various surfaces but has the low flexibility at low temperature and as a result, there is a need to increase the stable adhesion and mechanical strength at low temperature. In order to solve the above problems, a plasticizers having compatibility with both of the polypropylene carbonate and the phenol-modified terpene resin may be added.

Hereinafter, the present invention will be described in detail.

The plasticizer according to the present invention needs to have compatibility with the polypropylene carbonate resin and the phenol-modified terpene resin. In this case, the amount of the plasticizer may be appropriately increased and reduced depending on the purpose. Generally, maximum 20 parts by weight of the plasticizer for every 100 parts by weight of resin may be added on the basis of plasticization efficiency. If the additive amount of the plasticizer is equal to or smaller than 2 parts by weight, the plasticizer is used for the hot melt adhesive having high hardness and if the additive amount of the plasticizer exceeds 2 parts by weight, the plasticizer is used for the hot melt adhesive having high impact resistance due to the flexibility thereof. When the plasticizer is added above 20 parts by weight, the adhesive may have a difficulty in securing the appropriate mechanical strength and may have excessively low viscosity. In particular, the adhesion of the adhesive may be degraded.

The plasticizer for the hot melt adhesive based on the polypropylene carbonate and the phenol-modified terpene resin has a structure in which glycerol carbonate represented by the following Chemical Formula 1, ethylene glycol represented by the following Chemical Formula 2, or propylene glycol represented by the following Chemical Formula 3 is added with maximum 7 moles of ethylene oxide and the terminals thereof are stopped by a methyl group.

[Chemical Formula 1]

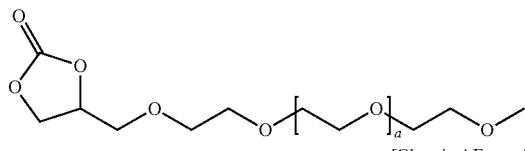

[Chemical Formula 2]

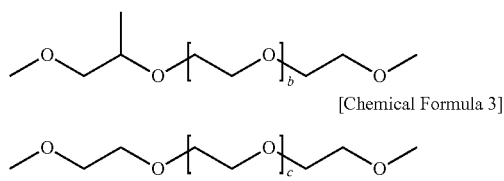

[Chemical Formula 3]

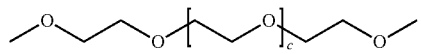

In the above chemical Formulas, a is an integer of 0 to 3 and b and c are an integer of 1 to 5.

As another type of plasticizer, a plasticizer having a structure in which Di-acid backbone represented by the following Chemical Formula 4 is attached with ethylene glycol oligomer may be used.

[Chemical Formula 4]

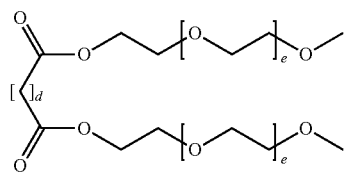

In the above Chemical Formula 4, d is an integer of 0 to 4 and e is an integer of 1 to 5.

The plasticizer according to the Chemical Formulas 1 to 4 has compatibility with both of the polypropylene carbonate and the tackifier of the phenol-modified terpene resin and thus, uniformly mixes the polypropylene carbonate and the phenol-modified terpene resin.

A softening point of the phenol-modified terpene resin is set to be 95 to 115° C. The reason is that the softening point of the adhesive composition may be lowered and the compatibility with the polypropylene carbonate resin may be good. If the softening point of the phenol-modified terpene resin is lower than 95° C., the softening point of the adhesive composition is too low and is excessively faster melted than the polypropylene when being melted, such that the phase separation occurs. If the softening point of the phenol-modified terpene resin is too high, it is disadvantage in that the softening point and the melting point of the adhesive composition may be increased accordingly.

If the using temperature of the hot melt adhesive prepared by the present invention does not exceed 190° C., it is advantageous in securing the heat stability and maintaining the appropriate viscosity.

The hot melt adhesive prepared as described above may be used for woodworking, paper box, bookbinding, or the like, which is only an example, and therefore, is not limited thereto.

Other features and aspects will be apparent from the following detailed description, the drawings, and the claims.

BRIEF DESCRIPTION OF THE DRAWINGS

FIG. 1 is a diagram showing a schematic configuration of measuring adhesion by bonding a hot melt sample between a wood and a PVC sheet.

DETAILED DESCRIPTION OF EMBODIMENTS

Hereinafter, the present invention will be described in more detail with reference to the following examples. However, the following examples only illustrate the present invention. Therefore, the present invention is not limited to the following examples.

EXAMPLE 1

Polypropylene carbonate resin (GeenPol™ available from SK energy Co.) having 30,000 g/mol of weight-average molecular weight was added with 10 parts by weight (phr) of glycerol carbonate (methoxy tri-ethylene glycol) ether and was added with 20 parts by weight of phenol-modified terpene resin (DS105 available from DRT Co.) having a softening point of 95° C., which were mixed at a temperature of 160° C. for 5 minutes in a Brabender mixer. A sheet was manufactured to have a thickness of 0.7 mm by being pressed by a heating press and various dumbbell type samples were manufactured, and then, the tensile strength and elongation thereof were measured. Further, as shown in FIG. 1, the sample having a size of 25 mm×10 mm was bonded between a wood and a PVC sheet at a temperature of 140° C. for 1 minute and then, the adhesion therebetween was measured by using UTM. Further, two PVC sheets were bonded to each other in the same condition and the adhesion therebetween was measured. A test speed was set to be 50 mm/min. The results obtained by performing the above-mentioned test on the plasticizer and the sample were arranged in Table 1.

EXAMPLE 2

The composition of a hot melt adhesive was prepared by the same method using Di(triethylene glycol monomethyl ether) glutarate, instead of using glycerol carbonate (methoxy tri-ethylene glycol) ether as the plasticizer in Example 1.

EXAMPLE 3

The sample was prepared and assessed by the same method without using the plasticizer in Example 1.

EXAMPLE 4

The hot melt adhesive composition was prepared by the same method without using the tackifier in Example 1.

EXAMPLE 5

The composition of a hot melt adhesive was prepared by the same method using 2-[2-[2-[2-(2-methoxypropoxy) ethoxy]ethoxy]ethyl methyl ether) of Chemical Formula 2, instead of glycerol carbonate (methoxy tri-ethylene glycol) ether as the plasticizer in Example 1.

EXAMPLE 6

The composition of a hot melt adhesive was prepared by the same method using tetraethylene glycol dimethyl ether of Chemical Formula 3, instead of glycerol carbonate (methoxy tri-ethylene glycol) ether as the plasticizer in Example 1.

EXAMPLE 7

The composition of a hot melt adhesive was assessed by the same method by adding 20 parts by weight of plasticizer in Example 1.

EXAMPLE 8

The composition of a hot melt adhesive was prepared by the same method using the polypropylene carbonate resin (GreenPol, Mw 80,000 of sample prepared by SK energy Co.) of which the weight-average molecular weight is 80,000 g/mol in Example 1.

EXAMPLE 9

The composition of a hot melt adhesive was prepared by the same method using the phenol-modified terpene resin (DS115) of which the softening point is 115° C. in Example 1.

COMPARATIVE EXAMPLE 1

The hot melt adhesive was prepared by mixing 20 parts by weight of vinyl acetate, 40 parts by weight of ethylene vinyl acetate, 40 parts by weight of rosin ester, and 20 parts by weight of paraffin wax and was assessed by the same method as Example 1.

COMPARATIVE EXAMPLE 2

The hot melt adhesive was prepared by adding the polypropylene carbonate of Example 1, instead of the ethylene vinyl acetate in Comparative Example 1 and was assessed by the same method as Example 1.

The experimental results were arranged in Table 1.

TABLE 1

| | Tensile Strength ($Kgf/cm^2$) | Elongation (%) | Adhesion between wood and PVC (Kgf) | PVC-PVC Adhesion (Kgf) |
|---|---|---|---|---|
| Example 1 | 293 | 170 | 43.2 | 42.4 |
| Example 2 | 288 | 172 | 39.3 | 38.9 |
| Example 3 | 285 | 102 | 54.8 | 45.8 |
| Example 4 | 304 | 145 | 55.9 | 35.3 |
| Example 5 | 290 | 180 | 54.9 | 38.2 |
| Example 6 | 287 | 179 | 58.7 | 37.7 |
| Example 7 | 271 | 230 | 50.6 | 35.1 |
| Example 8 | 310 | 170 | 52.1 | 35.6 |
| Example 9 | 312 | 165 | 53.3 | 39.7 |
| Comparative Example 1 | 275 | 164 | 40.6 | 32.1 |
| Comparative Example 2 | 215 | 103 | 27.9 | 23.1 |

It can be appreciated from the results of Table 1 that the hot melt resin composition according to the present invention is higher in the wood-wood adhesion that is a cellulose surface of polarity and the PVC-PVC adhesion than the ethylene vinyl acetate-based hot melt or the hot melt composition composed of only the polypropylene carbonate. In addition, it can be appreciated that the adhesion of the polypropylene carbonate resin alone is much higher in the wood-wood adhesion of polarity than the ethylene vinyl acetate-based hot melt composition. It shows that the balance of the adhesion to be achieved by the present invention secures the adhesion to the polar surface from the polypropylene carbonate and the adhesion to the non-polar surface from the phenol-modified terpene resin.

The tackifier such as rosin, rosin ester, petroleum resin in addition to the phenol-modified terpene resin according to the present invention partially or entirely causes the phase separation of the polypropylene carbonate, thereby lowering the cohesive energy and thus lowering the mechanical strength. The plasticizer proposed in the present invention provides the complete compatibility between the polypropylene and the phenol-modified terpene resin, thereby securing the mechanical strength and the adhesion to be achieved by the present invention.

The present invention prepares the hot melt adhesive composed of the polypropylene carbonate, the phenol-modified terpene resin having the compatibility with the polypropylene carbonate, and the plasticizer completely mixing the two resins. The hot melt adhesive composed of the combination of the three materials are prepared using carbon dioxide as a raw material to implement the adhesion to the polar surface while reducing the carbon emission, secures the adhesion to the non-polar surface due to the phenol-modified terpene resin and uniformly mixes the polypropylene carbonate and the phenol-modified terpene resin due to the excellent compatibility therebetween. In this case, the completely uniform mixing provides the improvement of the adhesion and mechanical strength of the hot melt adhesive according to the present invention.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A composition of a hot melt adhesive including polypropylene carbonate resin and phenol-modified terpene resin.

2. The composition of a hot melt adhesive of claim 1, wherein a weight-average molecular weight of the polypropylene carbonate resin to 5,000 to 100,000 g/mol.

3. The composition of a hot melt adhesive of claim 1, wherein the polypropylene carbonate is acquired by polymerization reaction of carbon dioxide and propylene oxide.

4. The composition of a hot melt adhesive of claim 1, further comprising at least one selected from compounds represented by the following Chemical Formulas 1 to 4, as a plasticizer:

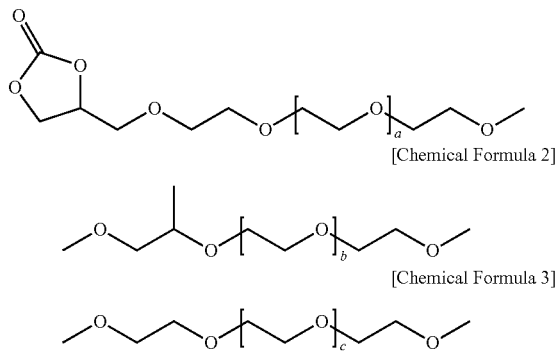

[Chemical Formula 1]

[Chemical Formula 2]

[Chemical Formula 3]

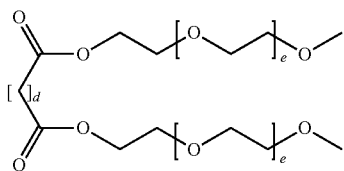

[Chemical Formula 4]

wherein,
a is an integer of 0 to 3;
b and c are an integer of 1 to 5;
d is an integer of 0 to 4; and
e is an integer of 1 to 5.

5. The composition of a hot melt adhesive of claim 4, wherein the plasticizer is added as 2 to 20 parts by weight for every 100 parts by weight of resin.

6. The composition of a hot melt adhesive of claim 1, wherein the softening point of the phenol-modified terpene resin is 95 to 115° C.

7. The composition of a hot melt adhesive of claim 1, wherein the using temperature of the composition of a hot melt adhesive is equal to or less than 190° C.

8. A hot melt adhesive including the composition of a hot melt adhesive of claim 1.

9. A hot melt adhesive including the composition of a hot melt adhesive of claim 3.

10. A hot melt adhesive including the composition of a hot melt adhesive of claim 4.

* * * * *